United States Patent
(12) United States Patent
Uenishi et al.

(10) Patent No.: US 12,737,681 B2
(45) Date of Patent: Sep. 15, 2026

(54) DISTRIBUTED REINFORCEMENT LEARNING SYSTEM AND DISTRIBUTED REINFORCEMENT LEARNING METHOD

(71) Applicant: Preferred Networks, Inc., Tokyo (JP)

(72) Inventors: Kota Uenishi, Tokyo (JP); Yasuhiro Fujita, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 925 days.

(21) Appl. No.: 18/146,061

(22) Filed: Dec. 23, 2022

(65) Prior Publication Data

US 2023/0125834 A1 Apr. 27, 2023

Related U.S. Application Data

(63) Continuation of application No. PCT/JP2021/024184, filed on Jun. 25, 2021.

(30) Foreign Application Priority Data

Jul. 3, 2020 (JP) ................................ 2020-115849

(51) Int. Cl.
*G06N 20/00* (2019.01)

(52) U.S. Cl.
CPC .................................. *G06N 20/00* (2019.01)

(58) Field of Classification Search
CPC .................................................... G06N 20/00
See application file for complete search history.

(56) References Cited

U.S. PATENT DOCUMENTS

| | | | | |
|---|---|---|---|---|
| 10,885,432 | B1 * | 1/2021 | Dulac-Arnold | G06N 3/006 |
| 2020/0145725 | A1 * | 5/2020 | Eberle | H04N 21/2387 |
| 2020/0151562 | A1 * | 5/2020 | Pietquin | G06N 3/0499 |
| 2020/0218999 | A1 * | 7/2020 | Eleftheriadis | G06N 3/092 |
| 2020/0244707 | A1 * | 7/2020 | Silver | G06N 3/045 |
| 2020/0265305 | A1 * | 8/2020 | Budden | G06N 3/08 |
| 2020/0302322 | A1 * | 9/2020 | Tukiainen | G06N 3/08 |
| 2021/0034970 | A1 * | 2/2021 | Soyer | G06N 3/084 |
| 2022/0343164 | A1 * | 10/2022 | Espeholt | G06N 3/092 |
| 2023/0125834 | A1 * | 4/2023 | Uenishi | G06N 3/006 706/12 |

OTHER PUBLICATIONS

Luo, Jieliang et al., "Dynamic Experience Replay", arXiv [online], Mar. 4, 2020, [retrieved on Aug. 27, 2025], Retrieved from <https://arxiv.org/abs/2003.02372>.

(Continued)

*Primary Examiner* — David E Choi
(74) *Attorney, Agent, or Firm* — IPUSA, PLLC

(57) ABSTRACT

A distributed reinforcement learning system includes one or more actor devices configured to acquire experience data, the experience data being used for reinforcement learning and corresponding to an action determined based on a model to be trained, a plurality of replay buffers configured to store the experience data acquired from the one or more actor devices, and one or more learner devices configured to train the model in the reinforcement learning, the reinforcement learning using the experience data stored in the plurality of replay buffers. The plurality of replay buffers are distributed and arranged in a plurality of nodes.

22 Claims, 8 Drawing Sheets

(56) References Cited

OTHER PUBLICATIONS

Horganm Dan et al., “Distributed Prioritized Experience Replay”,OpenReview.net [online], Jan. 11, 2018, [retrieved on Aug. 27, 2025], Retrieved from <https://openreview.net/forum?id=H1Dy - - - 0Z>.
Lasse Espeholt et al., “IMPALA: Scalable Distributed Deep-RL with Importance Weighted Actor-Learner Architectures” Jun. 28, 2018.
Reverb, <URL: https://www.deepmind.com/open-source/reverb>, May 26, 2020, Retrieved on Sep. 28, 2022.
GitHub—deepmind/reverb: Reverb is an efficient and easy-to-use data storage and transport system designed for machine learning research, <URL: https://github.com/deepmind/reverb>, Jun. 6, 2020 version <URL: https://web.archive.org/web/20200606020906/https://github.com/deepmind/reverb>.
GitHub—deepmind/scalable_agent: A TensorFlow implementation of Scalable Distributed Deep-RL with Importance Weighted Actor-Learner Architectures., <URL: https://github.com/deepmind/scalable_agent>, Apr. 17, 2020 version <URL: https://web.archive.org/web/20200417233903/https://github.com/deepmind/scalable_agent>.
Arun Nair et al., “Massively Parallel Methods for Deep Reinforcement Learning”, Jan. 1, 2015, <URL: https://deepmind.com/research/publications/massively-parallel-methods-deep-reinforcement-learning/>, Dec. 31, 2018 version <URL: https://web.archive.org/web/20181231173213/https://deepmind.com/research/publications/massively-parallel-methods-deep-reinforcement-learning/>.
OpenAI et al., “Dota 2 with Large Scale Deep Reinforcement Learning”, Dec. 13, 2019.
OpenAI Five, Jun. 25, 2018, <URL: https://openai.com/blog/openai-five/>, Jul. 2, 2020 version <URL: https://web.archive.org/web/20200702094237/https://openai.com/blog/openai-five/>.
Eric Liang et al., “RLlib: Abstractions for Distributed Reinforcement Learning”, Jun. 29, 2018.
Ray/rllib at master • ray-project/ray • GitHub, <URL: https://github.com/ray-project/ray/tree/master/rllib>, Retrieved on Oct. 17, 2022.
Philipp Moritz et al., “Ray: A Distributed Framework for Emerging AI Applications”, Oct. 2018, <URL: https://www.usenix.org/conference/osdi18/presentation/moritz>, Retrieved on Oct. 17, 2022.
Adam Stooke et al., “rlpyt: A Research Code Base for Deep Reinforcement Learning in PyTorch”, Sep. 24, 2019.
Dmitry Kalashnikov et al., “QT-Opt: Scalable Deep Reinforcement Learning for Vision-Based Robotic Manipulation”, Nov. 28, 2018.
Mnih, Volodymyr et al. “Asynchronous Methods for Deep Reinforcement Learning”, arXiv[online], Jun. 16, 2016, Retrieved from <https://arxiv.org/abs/1602.01783>.

* cited by examiner 10
20_1
20_2
AllReduce
L
100
Sample
50
RB
SetExperience
GetModel
30_1
30_2
A
200
SINGLE COMPUTER
Learner
Replay Buffer
Actors
(Agent + Environment)

10
20_1
20_2
AllReduce
L
100
Sample
50
RB
SetExperience
60_1
60_2
Controller
GetModel
30_1
30_2
A
200
SINGLE COMPUTER
Learner
Replay Buffer
Actors
(Agent + Environment)

10B
20B_1
20B_2
AllReduce
L
100B
Sample
50B
RB
SetExperience
GetModel
30A_1
30A_2
A
200B
SINGLE COMPUTER
Learner
Replay Buffer
Actors
(Agent + Environment)

10C
20C_1
20C_2
AllReduce
L
100C
Sample
50C
RB
SetExperience
GetModel
30C_1
30C_2
A
200C
SINGLE COMPUTER
Learner
Replay Buffer
Actors
(Agent + Environment)

DISTRIBUTED REINFORCEMENT LEARNING SYSTEM AND DISTRIBUTED REINFORCEMENT LEARNING METHOD

CROSS-REFERENCE TO RELATED APPLICATIONS

This application is a continuation application of International Application No. PCT/JP2021/024184 filed on Jun. 25, 2021, and designating the U.S., which is based upon and claims priority to Japanese Patent Application No. 2020-115849, filed on Jul. 3, 2020, the entire contents of which are incorporated herein by reference.

BACKGROUND

1. Technical Field

The present disclosure relates to a distributed reinforcement learning system and a distributed reinforcement learning method.

2. Description of the Related Art

Reinforcement learning is gaining attention as a method of machine learning. In typical reinforcement learning, an agent observes an environment, selects an action according to a policy based on the observed environment, and acquires a reward from the environment for a state transition caused by the action. The policy used by the agent is learned so that the reward acquired for a selectable action sequence is maximized. Additionally, in deep reinforcement learning, the policy to be trained is implemented as a deep learning model such as a neural network.

Acquiring a useful policy requires a large number of trials, and distributed reinforcement learning is gaining attention as one approach to efficiently learn a policy based on a large amount of acquired experience data. In distributed reinforcement learning, a policy is learned in a distributed manner by multiple learner devices that train the policy and multiple actor devices that provide experience data to the learner devices.

SUMMARY

According to one aspect of the present disclosure, a distributed reinforcement learning system includes one or more actor devices configured to acquire experience data, the experience data being used for reinforcement learning and corresponding to an action determined based on a model to be trained, a plurality of replay buffers configured to store the experience data acquired from the one or more actor devices, and one or more learner devices configured to train the model in the reinforcement learning, the reinforcement learning using the experience data stored in the plurality of replay buffers. The plurality of replay buffers are distributed and arranged in a plurality of nodes.

DETAILED DESCRIPTION

In the following, embodiments of the present disclosure will be described with reference to the drawings. In the following embodiments, a distributed reinforcement learning system that achieves distributed reinforcement learning is disclosed.

[Distributed Reinforced Learning System]

Figure 1:
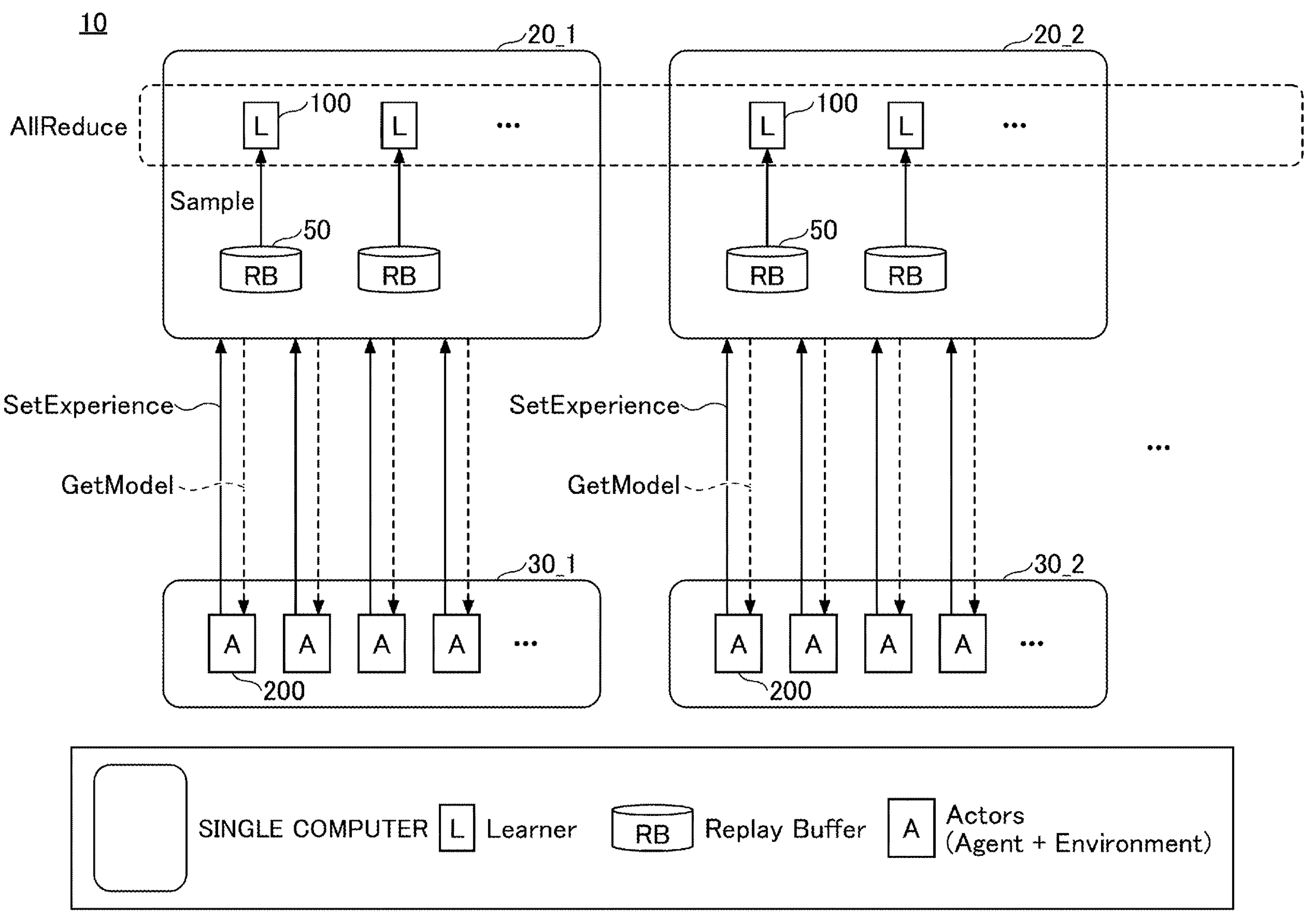
FIG. 1 is a schematic diagram illustrating an architecture of a distributed reinforcement learning system according to an embodiment of the present disclosure.

First, a distributed reinforcement learning system according to an embodiment of the present disclosure is described with reference to FIG. 1. FIG. 1 is a schematic diagram illustrating an architecture of a distributed reinforcement learning system 10 according to the embodiment of the present disclosure. The distributed reinforcement learning system 10 uses a technique called experience replay in reinforcement learning for a model to be trained. This technique holds a state history (=multiple experience data) of one or more previous episodes and uses randomly sampled data from the state history for reinforcement learning.

As illustrated in FIG. 1, the distributed reinforcement learning system 10 according to the present embodiment includes multiple computers (nodes) 20_1, 20_2, . . . , and multiple computers (nodes) 30_1, 30_2, . . . . Each computer **20_*i* (i=1, 2, . . . ) includes a replay buffer 50 and a learner device 100. That is, multiple learner devices are distributed and arranged in multiple nodes, and multiple replay buffers are also distributed and arranged in multiple nodes. Each computer 30_*j* (j=1, 2, . . . ) includes an actor device 200. For example, each computer 20_*i* includes multiple graphics processing units (GPUs), and each learner device 100** is implemented by the GPU.

In the illustrated example architecture, each learner device 100 is associated with a single corresponding replay buffer 50 on a one-to-one basis, but the distributed reinforcement learning system according to the present disclosure is not limited to this architecture and M replay buffers 50 may be associated with L learner devices.

The replay buffer 50 stores experience data for reinforcement learning that is provided by the actor device 200. The experience data may be described, for example, in a data format (s, a, r, s'), where s indicates a state of an environment observed by an agent of the actor device 200, a indicates an action selected (determined) by the agent of the actor device 200, r indicates a reward acquired from the environment by the selected action a, and s' indicates a next state of the environment to which the state is transitioned by the selected action a. The group of the actor devices 200 distributes the generated experience data to the replay buffers 50 so that each replay buffers 50 stores different experience data from other replay buffers 50. That is, in the distributed reinforcement learning system 10 according to the present embodiment, not only the learner devices 100 but also the replay buffers 50 are distributed. With this configuration, it is not necessary to configure a huge data storage in comparison with a case where the group of the learner devices 100 shares a single replay buffer 50, thereby improving the speed and simplifying the architecture.

In the illustrated embodiment, the replay buffer 50 is provided in the computer 20_*i* including the learner device 100, but the replay buffer 50 according to the present disclosure is not limited to this and may be implemented in a device independent of the computer 20_*i* and the like, as described below.

The learner device 100 trains a policy π for determining the action a based on the state s by using the experience data acquired from the associated replay buffer 50. For example, the policy π is implemented as a model of a function that outputs the action a or its distribution from the state s, and in the present embodiment, the policy π is implemented as a neural network. In another embodiment, the policy π may be implemented as a model that approximates an actional value function Q(s, a). For example, it may be implemented as a neural network that outputs an approximate value of a future expected cumulative reward in response to the state s and the action a being input, or as a neural network that outputs an approximate value of a future expected cumulative reward for each possible action a in response to the state s being input. As described, the policy π in the present embodiment is implemented by a neural network, and thus parameters of the neural network (connection loads, biases, and the like) can be called parameters of the policy π.

In the distributed reinforcement learning, each learner device 100 first initializes a policy model π to be trained (a target policy model π), and the group of the learner devices 100 holds the identical initialized target policy models π. Each learner device 100 then calculates a gradient of the neural network that improves the policy model π based on the experience data acquired from the associated replay buffer 50. Each learner device 100 then transmits the calculated gradient to another learner device 100 and collects the gradient calculated by another learner device 100. Each learner device 100 then calculates the average of the gradients of the group of the learner devices 100 and updates the parameters of the target policy model π based on the calculated average gradient. As a result of updating the identical target policy models π by a common average gradient, each learner device 100 will have the identical target policy model π after the parameters are updated.

The actor device 200 acquires the experience data by using the target policy model π acquired from the group of the learner devices 100. Specifically, each actor device 200 functions as both an agent and an environment in reinforcement learning, acquires the target policy model π from the group of the learner devices 100, and initializes the environment. Because the environment is randomly initialized in each actor device 200, the initialized environment can be different for each actor device 200. The actor device 200 observes the environment, inputs the state s of the environment obtained by observation into the policy model π acquired from the group of the learner devices 100, and acquires the action a from the policy model π. Subsequently, the actor device 200 acquires the reward r and the next state s' obtained as a result of the action a and generates the experience data (s, a, r, s').

The actor device 200 then transmits the generated experience data (s, a, r, s') to the replay buffer 50. For example, the group of the actor devices 200 may transmit the experience data to the group of the replay buffers 50 such that the number of pieces of the provided experience data is identical among the group of the replay buffers 50.

In the illustrated embodiment, multiple actor devices 200 are provided, but the distributed reinforcement learning system 10 according to the present disclosure is not limited to this, and a single actor device 200 may generate and distribute the experience data to the group of the replay buffers 50.

[Model Learning Process of the Learner Device]

Next, with reference to FIG. 2, a model learning process of the learner device 100 according to the embodiment of the present disclosure will be described. The model learning process is performed by the learner device 100 described above, and can be achieved, for example, by one or more processors (for example, the GPUs) implementing the learner device 100 executing a program stored in one or more memories of the computer 20_*i*. Additionally, in the distributed reinforcement learning system 10 according to the present embodiment, each learner device 100 in the group of the learner devices 100 synchronously executes distributed reinforcement learning by substantially the same model learning process based on, for example, a synchronous stochastic gradient descent (synchronous SGD), by using the experience data acquired from the replay buffer 50 associated with the learner device 100 in the group of the replay buffers 50 storing the experience data different from each other.

Figure 2:
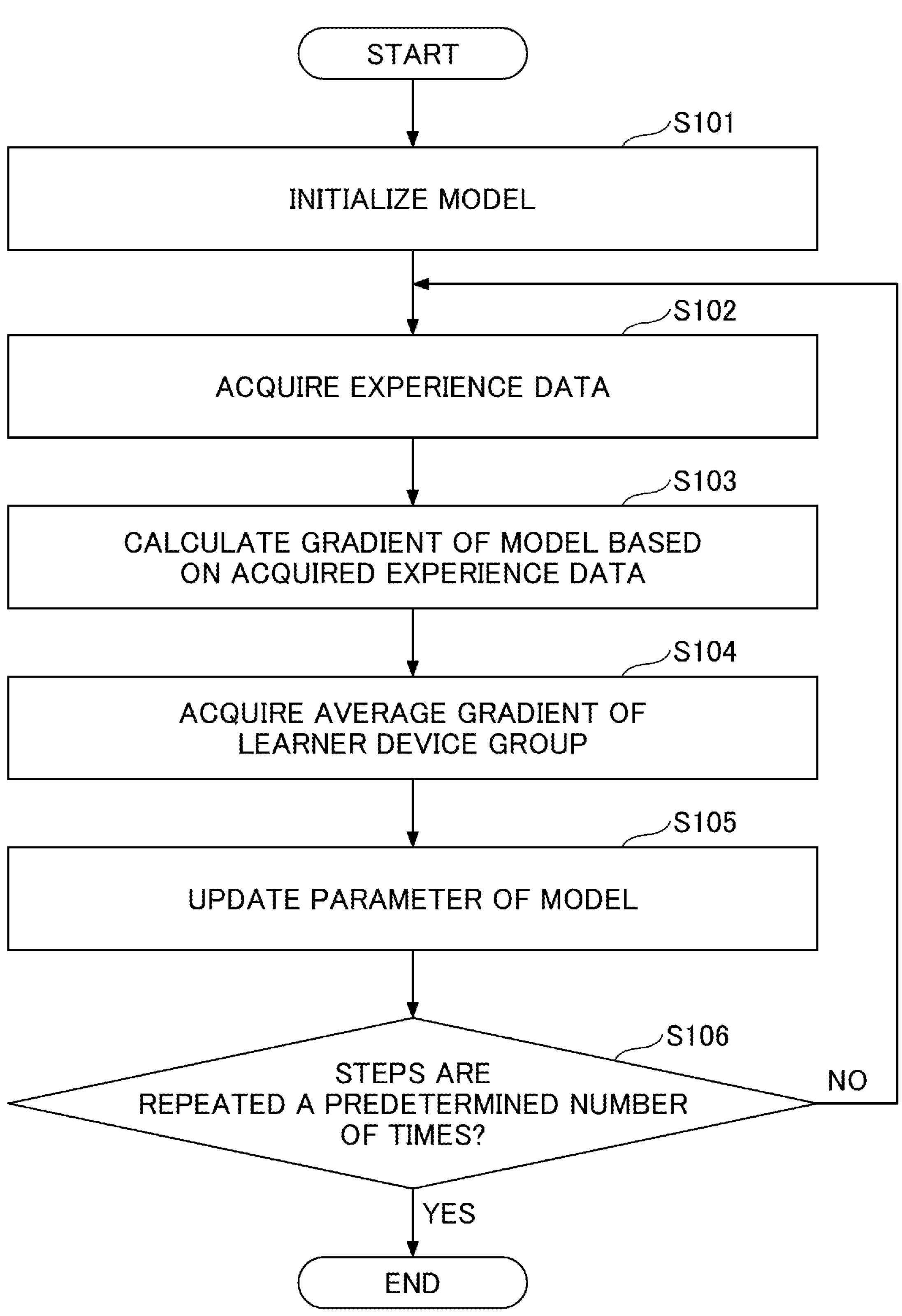
FIG. 2 is a flow chart illustrating a model learning process of a learner device according to the embodiment of the present disclosure.

FIG. 2 is a flow chart illustrating the model learning process of the learner device 100 according to the embodiment of the present disclosure.

As illustrated in FIG. 2, in step S101, the learner device 100 initializes the target policy model π. Here, because the initialized policy model π is common among the learner devices 100, the policy model π initialized by a specific learner device 100 may be delivered to the group of the learner devices 100, for example. Additionally, the target policy model π in the present embodiment is implemented as a neural network.

In step S102, the learner device 100 acquires the experience data from the associated replay buffer 50 by random sampling. The experience data acquired by the learner device is shuffled through random sampling. The group of the replay buffers 50 holds the experience data different from each other, and thus each learner device 100 trains the target policy model π by using the different experience data.

In step S103, the learner device 100 calculates the gradient to improve the policy model π based on the acquired experience data (s, a, r, s').

In step S104, the learner device 100 acquires the average gradient of the group of the learner devices 100. For example, each learner device 100 may collect the gradient calculated by the other learner devices 100 and calculate the average gradient of the group of the learner devices 100. Alternatively, a specific learner device 100 may collect the gradients from all learner devices 100, calculate the average gradient of the collected gradients, and distribute the calculated average gradient to the group of the learner devices 100. This allows each learner device to acquire the average gradient common with the other learner devices. Such an operation, in which array data stored by all processes (learner devices) is aggregated and all processes acquire the result equally, is called AllReduce, and there are several variations in the AllReduce algorithm. For example, a Ringtype AllReduce algorithm can be applied as the previously mentioned algorithm in which each learner device collects gradients calculated by the other learner devices and calculates average gradient by itself.

In step S105, the learner device 100 updates the parameters of its own target policy model π, based on the acquired average gradient. Note that the updated policy models π among the learner devices 100 will be identical because the parameters of the target policy model π that are common among the learner devices 100 are updated by the average gradient that is common among to the group of the learner devices 100.

In step S106, the learner device 100 determines whether steps S102 to S105 have been repeated a predetermined number of times. When steps S102 to S105 have been repeated a prescribed number of times (S105: YES), the learner device 100 terminates the model learning process. If steps S102 to S105 have not been repeated a predetermined number of times (S105: NO), the learner device 100 returns to step S102 and repeats the processing described above for the next experience data.

[Experience Data Acquisition Process of the Actor Device]

Next, with reference to FIG. 3, an experience data acquisition process of the actor device 200 according to the embodiment of the present disclosure will be described. The experience data acquisition process is performed by the above-described actor device 200, and can be achieved, for example, by one or more processors (for example, CPUs) implementing the actor device 200 executing a program stored in one or more memories of the computer 30_*i*. Additionally, in the distributed reinforcement learning system 10 according to the embodiment, each actor device 200 in the group of the actor devices 200 acquires the policy model π that is trained by the group of the learner devices 100, and acquires the experience data by using the acquired policy model π.

Figure 3:
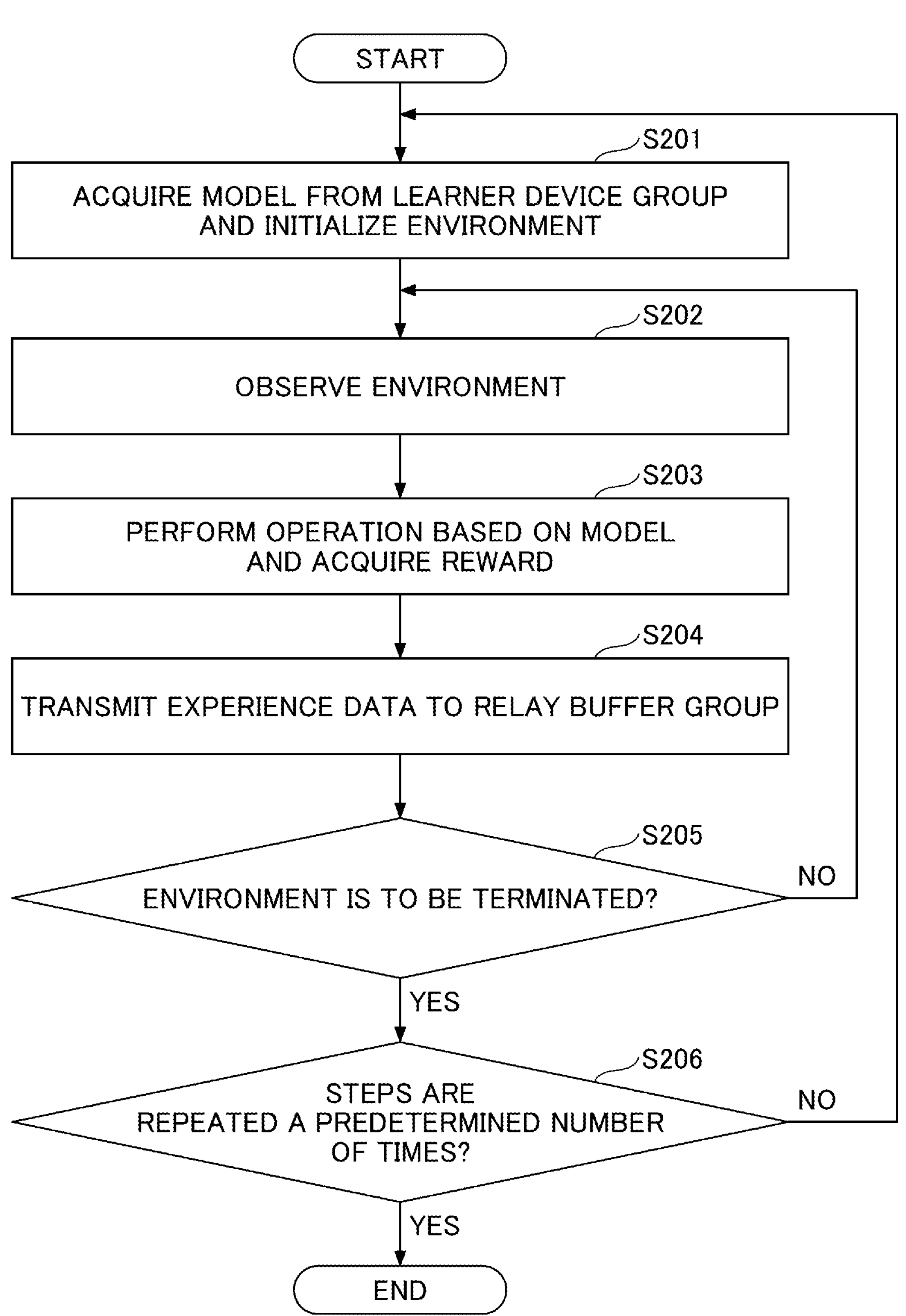
FIG. 3 is a flow chart illustrating an experience data acquisition process of an actor device according to the embodiment of the present disclosure.

FIG. 3 is a flow chart illustrating the experience data acquisition process of the actor device 200 according to the embodiment of the present disclosure.

As illustrated in FIG. 3, in step S201, the actor device 200 acquires the policy model π from the group of the learner devices 100 and initializes the environment in the reinforcement learning. That is, one episode begins. Here, each actor device 200 randomly initializes the environment to be used by itself. Thus, a different environment is set for each actor device 200. As can be found based on the fact that step S201 is performed following the step S206 described below, the actor device repeats the acquisition of the policy model π from the learner device at periodic intervals.

In step S202, the actor device 200 observes the environment and identifies the state s of the environment.

In step S203, the actor device 200 inputs the observed state s into the policy model π, operates in accordance with the action a that is outputted from the policy model π, and acquires the reward r based on a state transition s→s' caused by the action a from the environment.

In step S204, the actor device 200 generates the experience data (s, a, r, s') based on the observed state s, the selected action a, the reward r, and the next state s', and transmits the generated experience data (s, a, r, s') to one of the replay buffers 50. For example, the actor device 200 may equally provide the experience data (s, a, r, s') to the associated replay buffers 50.

In step S205, the actor device 200 determines whether to terminate the environment. That is, the actor device 200 determines whether to terminate the episode started from S201. In the reinforcement learning, a goal is set when a task is performed in the environment. The goal is, for example, lifting an object or moving an object to a destination. Termination conditions of the environment include, for example, a case in which the goal is achieved, a case in which the goal is not achieved within a finite time, and the like. If the environment is terminated (S205: YES), the experience data acquisition process moves to step S206. If the environment is not terminated (S205: NO), the actor device 200 returns to step S202 and repeats the above-described processing.

In step S206, the actor device 200 determines whether steps S202 to S205 have been repeated a predetermined number of times. If steps S202 to S205 have been repeated the predetermined number of times (S206: YES), the experience data acquisition process ends. If steps S202 to S205 have not been repeated the predetermined number of times (S206: NO), the actor device 200 returns to step S201 and repeats the above-described processing.

Modified Embodiment

Figure 4:
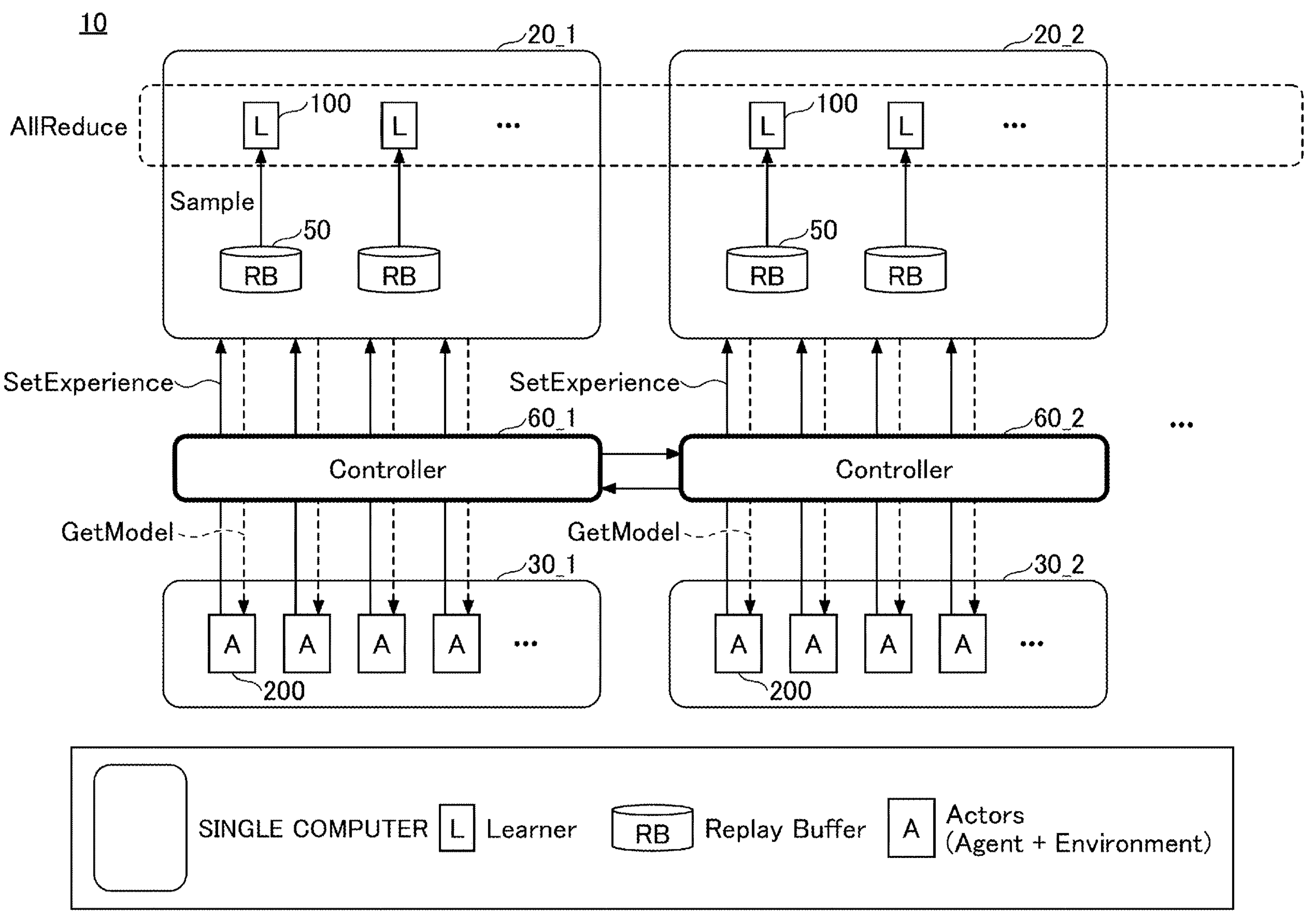
FIG. 4 is a schematic diagram illustrating an architecture of a distributed reinforcement learning system according to another embodiment of the present disclosure.

Next, a distributed reinforcement learning system 10 according to another embodiment of the present disclosure will be described with reference to FIG. 4. FIG. 4 is a schematic diagram illustrating an architecture of the distributed reinforcement learning system 10 according to another embodiment of the present disclosure. As illustrated in FIG. 4, in the present embodiment, a controller 60_*i* is provided between the computer 20_*i* and the computer 30_*j*, and the experience data provided by the actor device 200 is distributed to the group of the replay buffers 50 via the controller 60_*i*. Here, the controller 60_*i* may be implemented in the computer 20_*i*.

As illustrated, the controller 60_*i* distributes the experience data acquired from the group of the actor devices 200 of the associated computer 30_*i* to the replay buffers 50 of the associated computer 20_*i*. For example, the controller 60_*i* may distribute the experience data acquired from the group of the actor devices 200 of the computer 30_*i* to the group of the replay buffers 50 such that the experience data is distributed equally to the group of the replay buffers 50 of the computer 20_*i*.

Additionally, the controller 60_*i* may transmit the experience data to or receive the experience data from another controller 60_*i*. In the illustrated embodiment, the controller 60_1 may transmit the experience data to or receive the experience data from the controller 60_2 and acquire the experience data generated by the actor device 200 of the computer 30_2 via the controller 60_2, and provide the acquired experience data to the replay buffer 50 of the computer 20_1.

Additionally, the controller 60_*i* has a cache function of the parameters of the target policy model π. The caching function allows the controller 60_*i* to reduce the load on the learner device by mediating the acquisition of the parameters of the policy model between the learner device and the actor device, and to speed up the acquisition of the parameters performed by the actor device. Specifically, the controller 60_*i* caches the parameters of the policy model π received from the learner device in the memory of the controller 60_*i* itself. When the controller 60_*i* receives a request to acquire a parameter from the actor device, the controller 60_*i* transmits the parameter cached in memory to the actor device if the parameter is not an old one that has been received before a certain time (e.g., 30 seconds) or more. If the parameter is the old one, the controller 60_*i* requests and acquires a latest parameter from the learner device, caches the parameters in the memory, and transmits the parameter to the actor device.

[Another Architecture]

Figure 5:
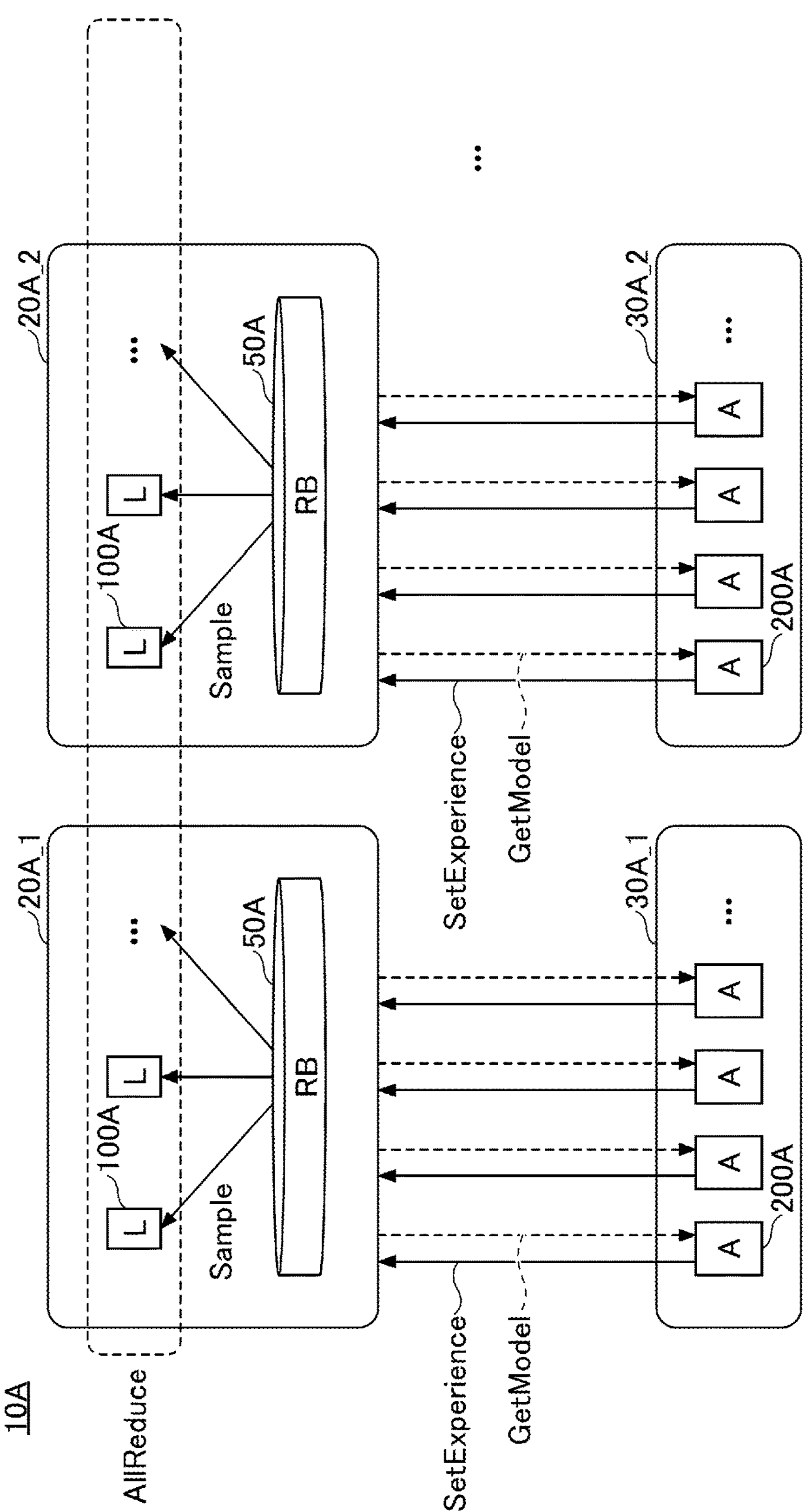
FIG. 5 is a schematic diagram illustrating an architecture of a distributed reinforcement learning system according to another embodiment of the present disclosure.
Figure 6:
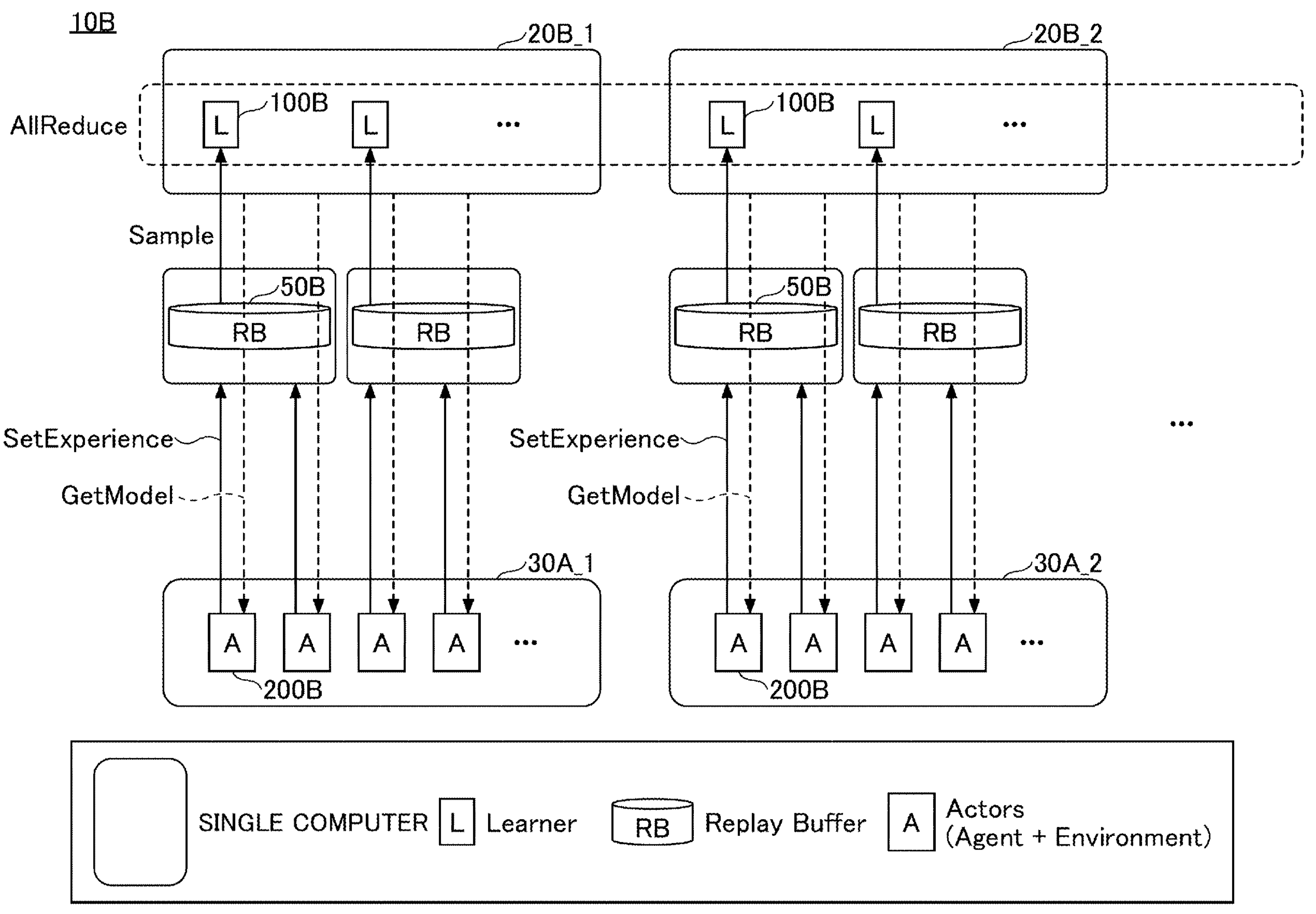
FIG. 6 is a schematic diagram illustrating an architecture of a distributed reinforcement learning system according to embodiment of the present disclosure.
Figure 7:
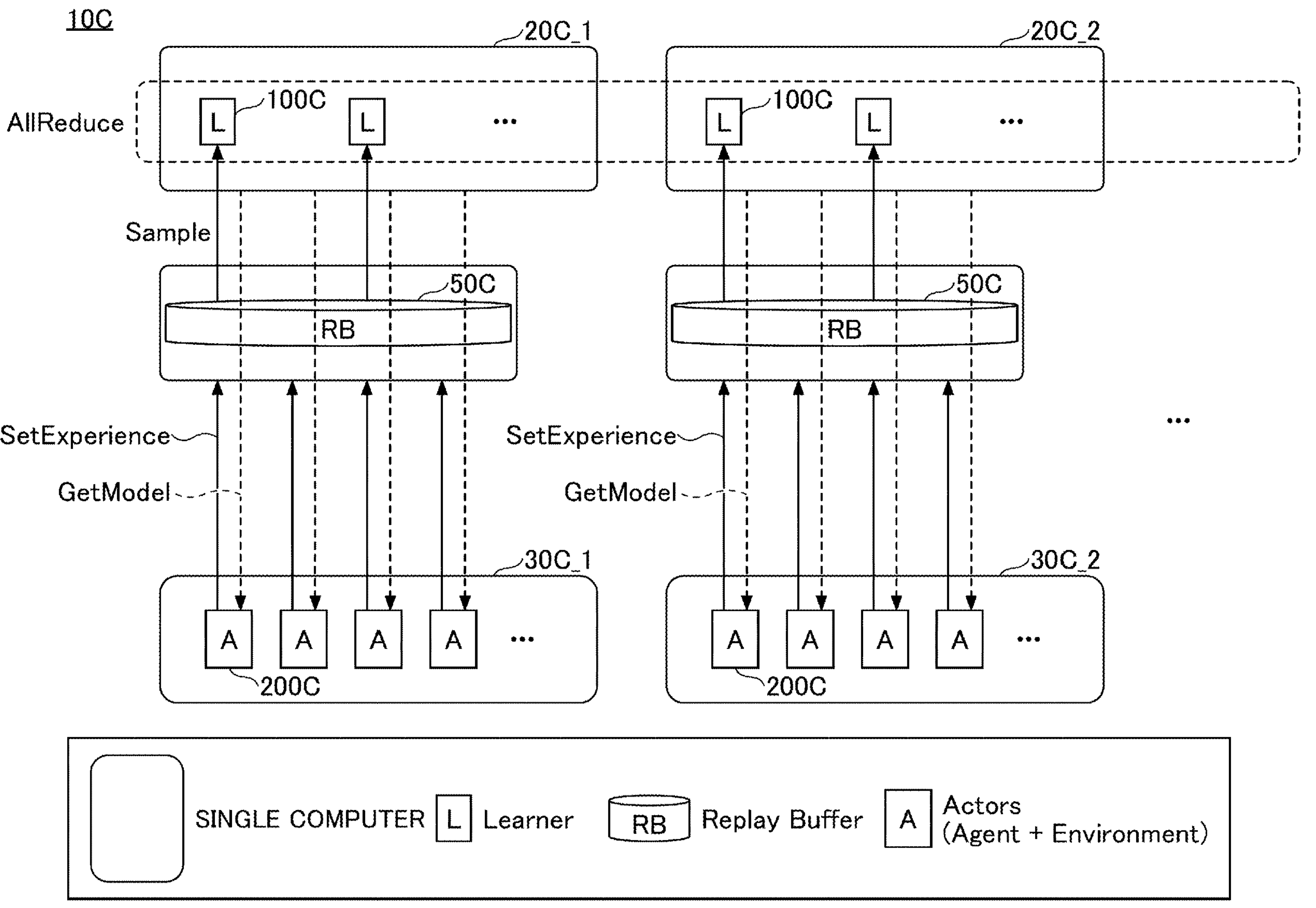
FIG. 7 is a schematic diagram illustrating an architecture of a distributed reinforcement learning system according to another embodiment of the present disclosure.

Next, an architecture of a distributed reinforcement learning system 10 according to another embodiment of the present disclosure will be described with reference to FIGS. 5 to 7. FIGS. 5 to 7 are schematic diagrams illustrating the architecture of the distributed reinforcement learning system 10 according to another embodiment of the present disclosure.

In a distributed reinforcement learning system 10A according to the embodiment illustrated in FIG. 5, a group of learner devices 100A in the computer 20_*i* is associated with a single replay buffer 50A, and each learner device 100A acquires different experience data from the common replay buffer 50A and trains the target policy model n by the acquired experience data. Each actor device 200A acquires the policy model π from the group of the learner devices 100A, uses the acquired policy model π to select the action for the observed environment, and acquires the reward from the environment based on the state transition caused by the action. Each actor device 200A then transmits, to the associated replay buffer 50A, the experience data that has been acquired in such a way.

Next, in a distributed reinforcement learning system 10B according to the embodiment illustrated in FIG. 6, a learner device 100B and a replay buffer 50B are implemented on different computers. Additionally, the learner device 100B in the computer 20B_i is associated with the replay buffer 50B on a one-to-one basis, and the group of the replay buffers 50B stores the experience data different from each other. Each learner device 100B acquires the experience data from the associated replay buffer 50B and trains the target policy model π by using the acquired experience data. Each actor device 200B acquires the policy model π from the group of the learner devices 100B, uses the acquired policy model π to select the action for the observed environment, and acquires the reward from the environment based on the state transition caused by the action. Each actor device 200B then transmits, to the associated replay buffer 50B, the experience data that has been acquired in such a way.

Next, in a distributed reinforcement learning system 10C according to the embodiment illustrated in FIG. 7, a learner device 100C and a replay buffer 50C are implemented on different computers. Additionally, the group of the learner devices 100C in the computer 20C_i is associated with a single replay buffer 50C, and the group of the replay buffers 50C stores the experience data different from each other. Each learner device 100C acquires the experience data from the associated replay buffer 50C and trains the target policy model π by using the acquired experience data. Each actor device 200C acquires the policy model π from the group of the learner devices 100C, uses the acquired policy model π to select the action for the observed environment, and acquires the reward from the environment based on the state transition caused by the action. Each actor device 200C then transmits, to the associated replay buffer 50C, the experience data that has been acquired in such a way.

In the embodiments illustrated in FIGS. 5 to 7, a controller 60 is not illustrated, but similar to the modified embodiment illustrated in FIG. 4, the controller 60 may be provided between the groups of the replay buffers 50A, 50B, and 50C and the groups of the actor devices 200A, 200B, and 200C to control the transfer of the experience data between the groups of the replay buffers 50A, 50B, and 50C and the groups of the actor devices 200A, 200B, and 200C.

Here, in the above-described embodiments, the computer 20_*i* implementing the learner device 100 includes multiple GPUs, but the distributed reinforcement learning system 10 according to the present disclosure is not limited to such an architecture. For example, it will be easily understood by those of ordinary skill in the art that the distributed reinforcement learning system 10 can be implemented, for example, by utilizing the computers 20_*i* in accordance with the number of the learner devices 100, for example, even if the computer 20_*i* includes only one GPU.

[Hardware Configuration]

Some or all of respective devices (the computer 20_*i* and the computer 30_*j*) in the above-described embodiments may be implemented by hardware or may be implemented by information processing of software (programs) executed by a central processing unit (CPU), a graphics processing unit (GPU), or the like. When the system is implemented by software information processing, the software implementing at least some of the functions of respective devices in the above-described embodiments may be stored in a non-transitory storage medium (a non-transitory computer-readable medium) such as a flexible disk, a compact disc-read only memory (CD-ROM), or a universal serial bus (USB) memory, and may be read into the computer to execute the software information processing. Additionally, the software may be downloaded via a communication network. Further, the information processing may be performed by hardware, with the software being implemented in circuits such as an application specific integrated circuit (ASIC) or a field programmable gate array (FPGA).

The type of the storage media that stores the software is not limited. The storage medium is not limited to a detachable medium such as a magnetic disk, an optical disk, or the like, and may be a fixed storage medium such as a hard disk drive, a memory, or the like. Additionally, the storage medium may be provided inside the computer or outside the computer.

Figure 8:
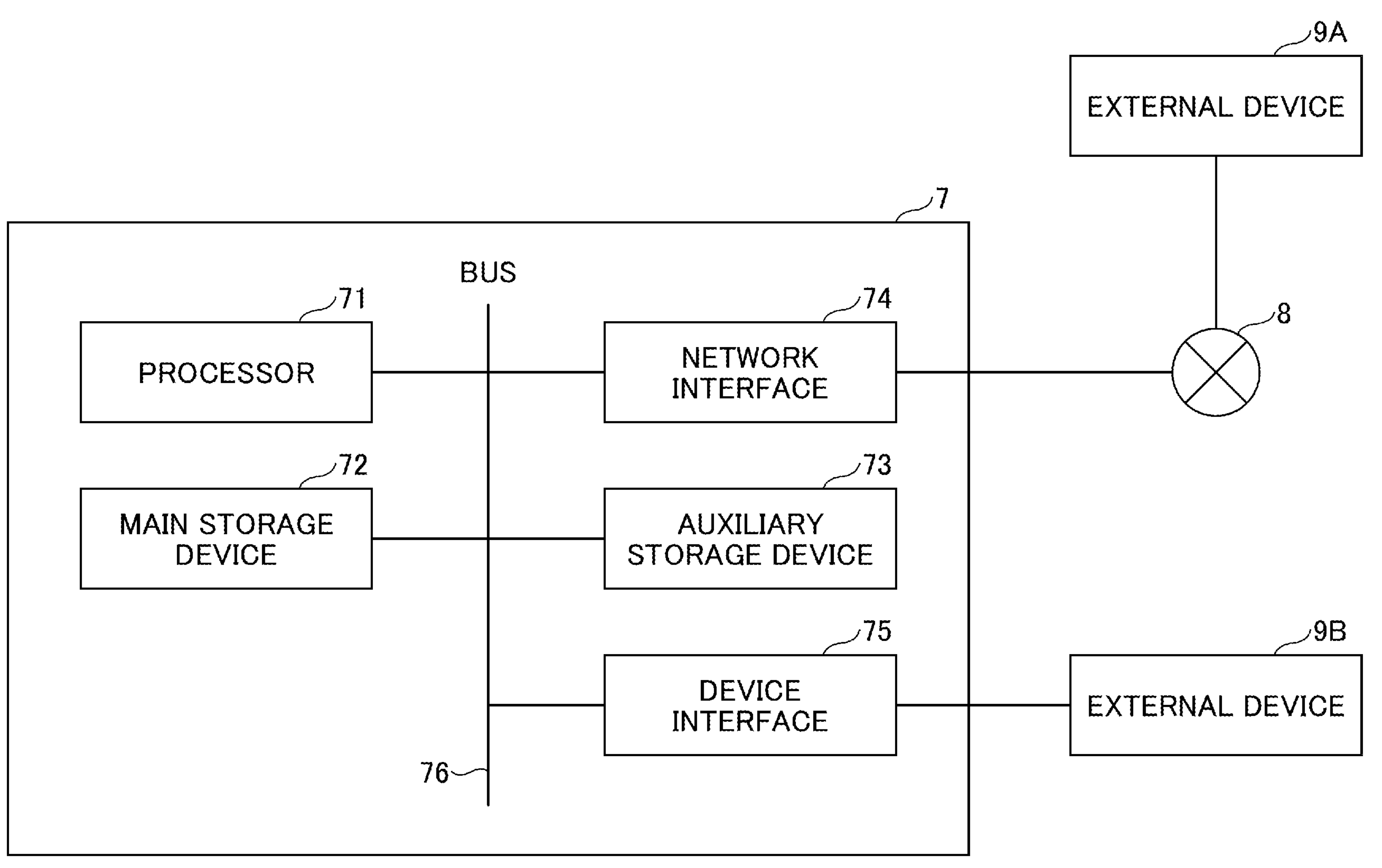
FIG. 8 is a block diagram illustrating a hardware configuration of various devices according to the embodiment of the present disclosure.

FIG. 8 is a block diagram illustrating an example of the hardware configuration of the respective devices (the computer 20_*i* and the computer 30_*j*) in the above-described embodiments. Each device may include, as an example, a processor 71, a main storage device 72 (a memory), an auxiliary storage device 73 (a memory), a network interface 74, and a device interface 75, and each device may be implemented as a computer in which these components are connected via a bus 76.

The computer in FIG. 8 includes one of each component, but may include multiple identical components. Additionally, although a single computer is illustrated in FIG. 8, the software may be installed in multiple computers, and the multiple computers may perform the same or different parts of the processing of the software. In this case, a form of distributed computing, in which respective computers communicate via the network interface 74 or the like to perform processing, may be used. That is, each device (the computer 20_*i* and the computer 30_*j*) in the above-described embodiments may be configured as a system that achieves a function by one or more computers executing instructions stored in one or more storage devices. Additionally, a configuration, in which information transmitted from a terminal is processed by one or more computers provided on a cloud, and a processing result is transmitted to the terminal, may be used.

The various operations of respective devices (the computer 20_*i* and the computer 30_*j*) in the above-described embodiments may be performed in parallel using one or more processors or using multiple computers via a network.

Additionally, various operations may be distributed among multiple cores in the processor and performed in parallel. Additionally, some or all of the processing, means, and the like of the present disclosure may be performed by at least one of processors and storage devices provided on a cloud that can communicate with a computer via a network. As described, each device in the above-described embodiment may be in a form of parallel computing performed by one or more computers.

The processor 71 may be an electronic circuit (a processing circuit, processing circuitry, a CPU, a GPU, an FPGA, an ASIC, or the like) including a controller and an arithmetic unit of a computer. Additionally, the processor 71 may be a semiconductor device or the like including a dedicated processing circuit. The processor 71 is not limited to an electronic circuit using electronic logic elements, and may be implemented by an optical circuit using optical logic elements. Additionally, the processor 71 may include an arithmetic function based on quantum computing.

The processor 71 can perform arithmetic processing based on data and software (programs) input from respective devices of the internal configuration of the computer and output an arithmetic result and a control signal to a device. The processor 71 may control respective components constituting the computer by executing the operating system (OS) of the computer, applications, and the like.

Each device (the computer 20_*i* and the computer 30_*j*) in the above-described embodiments may be implemented by one or more processors 71. Here, the processor 71 may indicate one or more electronic circuits arranged on one chip, or one or more electronic circuits arranged on two or more chips or two or more devices. When multiple electronic circuits are used, respective electronic circuits may communicate by wire or wireless.

The main storage device 72 is a storage device that stores instructions to be executed by the processor 71, various data, and the like, and information stored in the main storage device 72 is read by the processor 71. The auxiliary storage device 73 is a storage device other than the main storage device 72. Here, these storage devices indicate any electronic component that can store electronic information, and may be semiconductor memories. The semiconductor memory may be either a volatile memory or a nonvolatile memory. The storage device that stores various data in each device (the computer 20_*i* and the computer 30_*j*) in the above-described embodiments may be implemented by the main storage device 72 or the auxiliary storage device 73, or by a built-in memory that is built in the processor 71. For example, the storage device in the above-described embodiments may be implemented by the main storage device 72 or the auxiliary storage device 73.

For a single storage device (memory), multiple processors may be connected (coupled) or a single processor may be connected. For a single processor, multiple storage devices (memories) may be connected (coupled). When each device (the computer 20_*i* and the computer 30_*j*) in the above-described embodiments includes at least one storage device (memory) and multiple processors connected (coupled) to the at least one storage device (memory), a configuration in which at least one processor among the multiple processors is connected (coupled) to the at least one storage device (memory) may be included. Additionally, the configuration may be achieved by storage devices (memories) and processors included in multiple computers. Further, a configuration (for example, an L1 cache, a cache memory including an L2 cache), in which a storage device (memory) is integrated with a processor, may be included.

The network interface 74 is an interface for connecting to a communication network 8 by wire or wirelessly. An appropriate interface such as one conforming to existing communication standards may be used for the network interface 74. Information may be exchanged with an external device 9A connected via the communication network 8, by using the network interface 74. Here, the communication network 8 may be any one or a combination of a wide area network (WAN), a local area network (LAN), a personal area network (PAN), and the like, as long as information is exchanged between the computer 20_*i* or 30_*j* and the external device 9A. An example of the WAN is the Internet or the like, an example of the LAN is IEEE 802.11, Ethernet (registered trademark), or the like, and an example of the PAN is Bluetooth (registered trademark), near field communication (NFC), or the like.

The device interface 75 is an interface such as a USB directly connected to the external device 9B or the like.

The external device 9A is a device connected to a computer via a network. The external device 9B is a device directly connected to a computer.

Additionally, the external device 9A or 9B may be a storage device (memory). For example, the external device 9A may be a network storage device or the like, and the external device 9B may be a storage device such as an HDD.

Additionally, the external device 9A or the external device 9B may be a device having functions of some of the components of each device (the computer 20_*i* and computer 30_*j*) in the above-described embodiments. That is, the computer may transmit or receive some or all of the processing results of the external device 9A or 9B.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-b-c-c. Further, the addition of another element other than the listed elements (i.e., a, b, and c), such as adding d as a-b-c-d, is included.

In the present specification (including the claims), if the expression such as "data as an input", "based on data", "according to data", or "in accordance with data" (including similar expressions) is used, unless otherwise noted, a case in which various data itself is used as an input and a case in which data obtained by processing various data (e.g., data obtained by adding noise, normalized data, and intermediate representation of various data) is used as an input are included. If it is described that any result can be obtained "based on data", "according to data", or "in accordance with data", a case in which a result is obtained based on only the data is included, and a case in which a result is obtained affected by another data other than the data, factors, conditions, and/or states may be included. If it is described that "data is output", unless otherwise noted, a case in which various data is used as an output is included, and a case in which data processed in some way (e.g., data obtained by adding noise, normalized data, and intermediate representation of various data) is used as an output is included.

In the present specification (including the claims), if the tams "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure of the processor may be implemented so as to actually perform the operation B irrespective of whether the control instruction and the data are actually attached.

In the present specification (including the claims), if a term indicating containing or possessing (e.g., "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number is used in another description (i.e., an expression using "a" or "an" as an article), it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, states, and/or the like are satisfied, and is not necessarily obtained in the claimed invention that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while another hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data.

Although the embodiments of the present disclosure have been described in detail above, the present disclosure is not limited to the specific embodiments described above. Various additions, modifications, substitutions, partial deletions, and the like may be made without departing from the conceptual idea and spirit of the invention derived from the contents defined in the claims and the equivalents thereof. For example, in all of the embodiments described above, if numerical values or mathematical expressions are used for description, they are presented as an example and are not limited thereto. Additionally, the order of respective operations in the embodiment is presented as an example and is not limited thereto.

What is claimed is:

1. A distributed reinforcement learning system comprising:

a plurality of actor devices, each of the plurality of actor devices comprising at least one processor and being configured to acquire experience data, and the experience data being used for reinforcement learning and corresponding to an action determined based on a model to be trained;

a plurality of replay buffers, each of the plurality of replay buffers comprising at least one memory and being configured to store the experience data acquired from a corresponding actor device among the plurality of actor devices; and one or more learner devices, each of the one or more learner devices comprising at least one processor and being configured to train the model in the reinforcement learning, and the reinforcement learning using the experience data stored in the plurality of replay buffers, wherein the plurality of replay buffers are distributed and arranged in a plurality of nodes, wherein a first group of one or more actor devices among the plurality of actor devices is associated with a first replay buffer among the plurality of replay buffers and a second group of one or more actor devices among the plurality of actor devices is associated with a second replay buffer among the plurality of replay buffers, the first replay buffer being different from the second replay buffer, wherein each actor device in the first group is configured to send the experience data to the first replay buffer and each actor device in the second group is configured to send the experience data to the second replay buffer, and wherein the first group of one or more actor devices is included in a first node, and the second group of one or more actor devices is included in a second node different from the first node.

2. The distributed reinforcement learning system as claimed in claim 1, wherein the experience data stored by each replay buffer of the plurality of replay buffers is different from the experience data stored by other replay buffers of the plurality of replay buffers.

3. The distributed reinforcement learning system as claimed in claim 1, wherein each replay buffer of the plurality of replay buffers is associated with one or more learner devices.

4. The distributed reinforcement learning system as claimed in claim 1, wherein a first learner device of the one or more learner devices acquires the experience data that is used for the reinforcement learning, from a replay buffer that is associated with the first learner device among the plurality of replay buffers.

5. The distributed reinforcement learning system as claimed in claim 1, wherein a first learner device of the one or more learner devices does not acquire the experience data that is used for the reinforcement learning from a replay buffer that is not associated with the first learner device among the plurality of replay buffers.

6. The distributed reinforcement learning system as claimed in claim 1, further comprising one or more controllers, each of the one or more controllers comprising at least one processor and being configured to acquire the experience data from the plurality of actor devices and distribute the acquired experience data to the plurality of replay buffers.

7. The distributed reinforcement learning system as claimed in claim 1, wherein each learner device of the one or more learner devices includes the model that is identical and updates parameters of the included model by using a gradient that is common with another learner device.

8. The distributed reinforcement learning system as claimed in claim 7, wherein each learner device of the one or more learner devices calculates the gradient of the model based on the experience data and transmits the gradient to another learner device.

9. The distributed reinforcement learning system as claimed in claim 1, wherein the plurality of actor devices repeatedly acquire information related to the model from the one or more learner devices at periodic intervals.

10. The distributed reinforcement learning system as claimed in claim 1, wherein each learner device of the one or more learner devices is associated with a corresponding replay buffer among the plurality of replay buffers on a one-to-one basis.

11. The distributed reinforcement learning system as claimed in claim 1, wherein a plurality of learner devices of the one or more learner devices are associated with a single replay buffer of the plurality of replay buffers.

12. The distributed reinforcement learning system as claimed in claim 1, wherein the first replay buffer among the plurality of replay buffers is arranged in the first node and is associated with the first group of one or more actor devices, and the second replay buffer among the plurality of replay buffers is arranged in the second node and is associated with the second group of one or more actor devices.

13. The distributed reinforcement learning system as claimed in claim 1, wherein the one or more learner devices are configured to transmit the trained model to the plurality of actor devices, the transmitted trained model being used by the plurality of actor devices in a next episode.

14. A distributed reinforcement learning method comprising:

acquiring, by each of a plurality of actor devices, experience data, each of the plurality of actor devices comprising at least one processor, and the experience data being used for reinforcement learning and corresponding to an action determined based on a model to be trained;

storing, by each of a plurality of replay buffers, the experience data acquired from a corresponding actor device among the plurality of actor devices, each of the plurality of replay buffers comprising at least one memory; and training, by each of one or more learner devices, the model in the reinforcement learning, each of the one or more learner devices comprising at least one processor, and the reinforcement learning using the experience data stored in the plurality of replay buffers, wherein the plurality of replay buffers are distributed and arranged in a plurality of nodes, wherein a first group of one or more actor devices among the plurality of actor devices is associated with a first replay buffer among the plurality of replay buffers and a second group of one or more actor devices among the plurality of actor devices is associated with a second replay buffer among the plurality of replay buffers, the first replay buffer being different from the second replay buffer, wherein the experience data acquired by each actor device in the first group is sent to the first replay buffer and the experience data acquired by each actor device in the second group is sent to the second replay buffer, and wherein the first group of one or more actor devices is included in a first node, and the second group of one or more actor devices is included in a second node different from the first node.

15. The distributed reinforcement learning system as claimed in claim 11, wherein the plurality of learner devices are included in a single node.

16. The distributed reinforcement learning system as claimed in claim 1, wherein the plurality of replay buffers are replay buffers used for Experience Replay, and each replay buffer holds a plurality of experience data to be randomly sampled for reinforcement learning.

17. The distributed reinforcement learning system as claimed in claim 10, wherein each learner device acquires the experience data from the corresponding replay buffer associated with the learner device and does not acquire the experience data from a replay buffer not associated with the learner device.

18. The distributed reinforcement learning system as claimed in claim 6, wherein the one or more controllers are further configured to acquire information related to the model from the one or more learner devices and provide the acquired information related to the model to the plurality of actor devices.

19. The distributed reinforcement learning system as claimed in claim 18, wherein the information related to the model includes parameters of the model, and the one or more controllers are configured to cache the parameters of the model.

20. The distributed reinforcement learning system as claimed in claim 6, wherein the one or more controllers distribute the acquired experience data to the plurality of replay buffers such that amounts of the experience data provided to the plurality of replay buffers are substantially equal.

21. The distributed reinforcement learning system as claimed in claim 3, wherein a first learner device of the one or more learner devices and the first replay buffer associated with the first learner device are implemented in different computers.

22. A controller for a distributed reinforcement learning system, comprising:

one or more processors;

one or more memories storing instructions that, when executed by the one or more processors, cause the controller to:

acquire experience data from one or more actor devices and distribute the acquired experience data to a plurality of replay buffers;

acquire information related to a model from one or more learner devices;

cache parameters of the model in the one or more memories; and provide the cached parameters to the one or more actor devices.

* * * * *